(12) United States Patent
Peeters

(10) Patent No.: US 6,523,770 B2
(45) Date of Patent: Feb. 25, 2003

(54) WINDING MECHANISM FOR A SUN SCREEN

(75) Inventor: Pieter Antoon Peeters, BV Horst (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/859,976

(22) Filed: May 17, 2001

(65) Prior Publication Data

US 2002/0011536 A1 Jan. 31, 2002

(30) Foreign Application Priority Data

May 17, 2000 (NL) .............................. 1015212

(51) Int. Cl.[7] .............................. B65H 75/48; B60J 1/20
(52) U.S. Cl. .................... 242/376; 160/262; 242/376.1; 242/279.2; 242/407; 242/613.1
(58) Field of Search .............................. 242/379, 379.2, 242/376, 376.1, 407, 613.1, 610.6; 160/309.322, 262

(56) References Cited

U.S. PATENT DOCUMENTS

| 456,200 | A | * | 7/1891 | Maxedon | 160/262 |
| 516,018 | A | * | 3/1894 | Lauer | 160/262 |
| 1,071,158 | A | * | 8/1913 | Hurlbut | 160/262 |
| 1,729,133 | A | * | 9/1929 | Shonnard | 160/313 |
| 3,075,805 | A | * | 1/1963 | Golde et al. | 160/262 |
| 3,092,174 | A | * | 6/1963 | Winn | 160/262 |
| 3,448,943 | A | * | 6/1969 | Herou | 160/313 |
| 5,056,839 | A | * | 10/1991 | Yoon | 160/262 |
| 6,079,474 | A | * | 6/2000 | Lin | 160/262 |

* cited by examiner

*Primary Examiner*—John M. Jillions
(74) *Attorney, Agent, or Firm*—Westman, Champlin & Kelly, P.A.; S. Koehler

(57) ABSTRACT

In a winding mechanism for a sun screen comprising a winding tube which is rotatable about a central axis for winding and unwinding the sun screen and driving means for said winding tube, the central axis is curved and the winding tube is flexible. A possible use of such a winding mechanism is in an open roof construction of a vehicle.

9 Claims, 1 Drawing Sheet

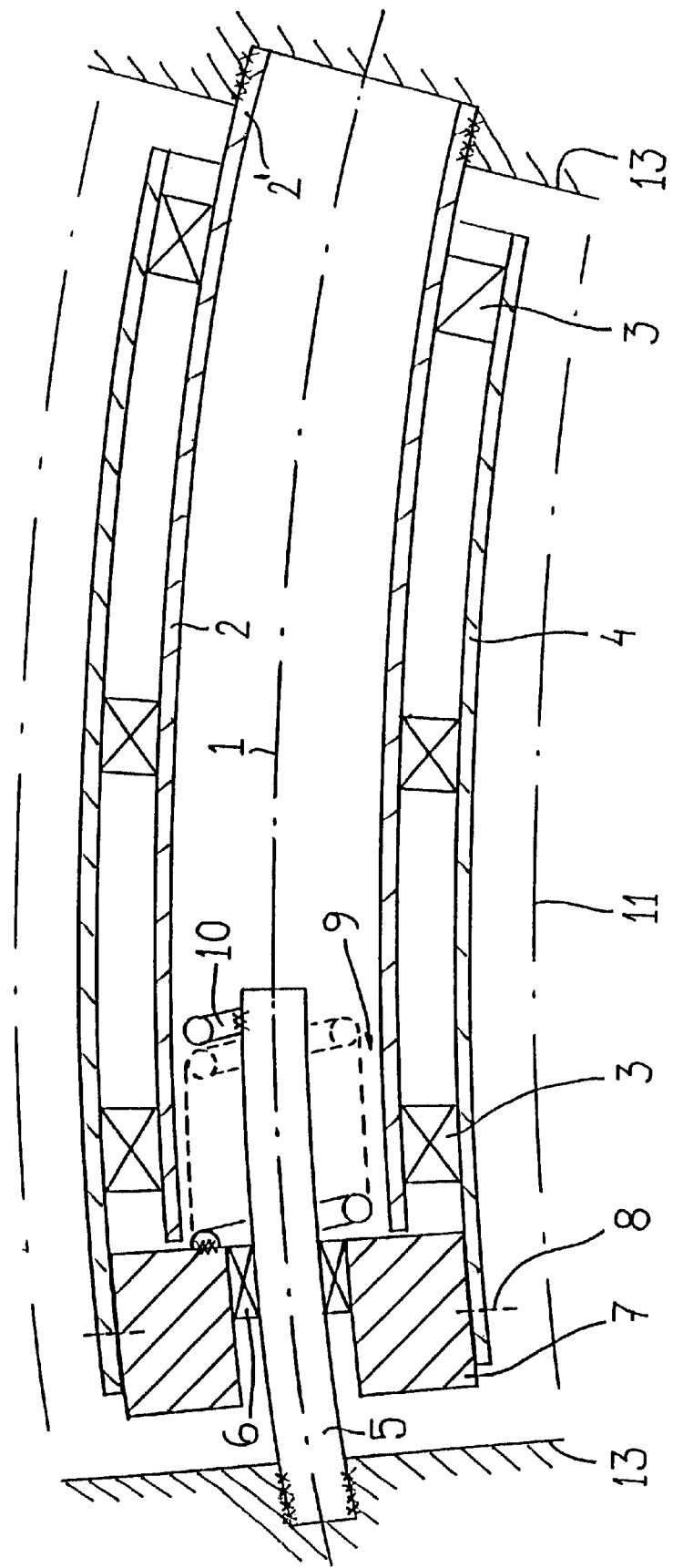

WINDING MECHANISM FOR A SUN SCREEN

SUMMARY OF THE INVENTION

The invention relates to a winding mechanism for a sun screen, for example as intended for use in an open roof construction for a vehicle, comprising a winding tube being rotatable about a central axis for winding and unwinding the sun screen and driving means for said winding tube.

In the aforesaid use in an open roof construction of a vehicle, the sun screen is capable of screening the roof opening that is formed in the open position of the open roof construction against entering sunlight. In the case of vehicle roofs which exhibit a distinct curvature in the transverse direction of the vehicle, the centre of the sun screen is positioned a considerable distance away from the roof top, so that the available headroom for occupants of the vehicle is significantly reduced.

It is an object of the present invention to provide a winding mechanism of the aforesaid type, by means of which the above drawback can be overcome in a simple yet efficient manner.

In order to accomplish that objective, the winding mechanism according to the present invention is characterized in that said central axis is curved, and in that the winding tube is flexible.

The curvature of the central axis can be so selected that the sun screen conforms to the inside contour of the roof as best as possible. In this manner, the amount of headroom that is lost in the unwound position of the sun screen is minimized. Also the winding mechanism itself occupies a minimum amount of space.

Since the winding tube must now be capable of rotation about a curved axis, the winding tube is made of a flexible material. Various plastic materials, among other materials, can be used for this purpose.

An additional advantage of such a constructional design of the winding mechanism is that the view to the front of those present in the rear of the vehicle is obstructed only minimally. In addition to that, a winding mechanism that conforms to the roof contour is aesthetically attractive.

In a preferred embodiment of the winding mechanism according to the invention, the central axis is defined by a stationary, curved inner tube, with the rotatable winding tube being mounted in bearings on said inner tube. The stationary, curved inner tube can be designed to exhibit a desired curvature adapted to that of the roof. Since the winding tube is mounted in bearings on the inner tube, the winding tube will maintain said curvature in every rotational position. The bearing between the winding tube and the inner tube furthermore provides a vibration-free positioning of the winding tube, thus ensuring an optimum operation. Furthermore, a smooth-running winding tube is obtained in this manner.

Said bearings may be spaced-apart ball bearings, for example. The number of bearings being used generally depends on the length of the winding mechanism.

Winding mechanisms of the type to which the invention relates may comprise various types of driving means. Most frequently, the driving means consist of a torsion spring engaging the winding tube for loading the winding tube to a wound position of the sun screen. With such an embodiment of the winding mechanism, it is possible according to one aspect of the invention for the inner tube to be fixed to a stationary frame of the winding mechanism with one end, at the location of a first end of the winding tube, while the other end of the inner tube terminates within the winding tube, wherein the winding tube is also mounted in bearings, at the other end thereof, on a stationary shaft which is fixed to the frame, which stationary shaft is co-axial with said central axis, and wherein said torsion spring is fitted between said stationary shaft and said winding tube.

In this manner an effective construction is obtained, wherein the torsion spring is integrated in the winding mechanism in a convenient manner. The frame may form part of a housing for the winding mechanism, or be a constructional element which is directly connected to the vehicle or the like.

The above embodiment of the winding mechanism according to the invention may furthermore be advantageously characterized in that said stationary shaft extends into the inner tube, and in that said torsion spring is accommodated in the annular space that is formed between said stationary shaft and the inner tube. In this way a compact construction is obtained.

Finally, as already briefly indicated in the foregoing, the winding mechanism may comprise a housing which accommodates the winding tube. In such a case it is preferred that the housing, too, exhibits a curvature which corresponds to the curvature of the central axis.

BRIEF DESCRIPTION OF THE DRAWING

The only figure is a schematic longitudinal sectional view of winding mechanism.

DETAILED DESCRIPTION OF AN ILLUSTRATIVE EMBODIMENT

The winding mechanism that is shown in the figure has a curved central axis 1. Said central axis 1 is defined by a stationary, curved inner tube 2, which is fixed with one end 2' to a stationary frame 13, for example the housing of a winding mechanism. A rotatable winding tube 4 is mounted on inner tube 2 by means of bearings 3. Said winding tube 4 is made of a flexible material.

Furthermore a stationary shaft 5, which is fixed to the frame, extends co-axially to central axis 1. An annular member 7 is mounted in bearings 6 on stationary shaft 5, which annular member can be coupled to winding tube 4 by coupling means 8 (only schematically indicated) to rotate along therewith.

Stationary shaft 5 extends into inner tube 2. A torsion spring 10 is present in the annular space 9 that is formed between inner tube 2 and stationary shaft 5, which torsion spring is connected to stationary shaft 5 with one end and to annular member 7 (and consequently to the rotatable winding tube 4) with its other end.

When the winding mechanism is used in an open roof construction of a vehicle having a curved roof, an inner tube 2 exhibiting a curvature which corresponds to that of the roof is selected. This makes it possible to adapt the curvature of the winding mechanism, in particular that of the winding tube 4 and of a sun screen to be unwound from said winding tube, optimally to the inside contour of the roof.

When the winding mechanism is being mounted, first the inner tube 2 is connected to frame 13 with its end 2'. Then winding tube 4 is mounted on inner tube 2 by means of bearings 3. Finally, the stationary shaft 5 and annular member 7 are slid into inner tube 2 and into winding tube 4, respectively, and winding tube 4 is fixed to annular member 7 by means of coupling means 8. The free end of stationary shaft 5 is also fixed to frame 13 at that stage.

A housing, schematically indicated by chain-dotted lines 11, of the winding mechanism may exhibit a corresponding curvature.

The invention is not restricted to the embodiments as described above and shown in the drawings, which can be varied in several ways without departing from the scope of the invention as defined in the claims. Thus the winding mechanism may be intended for uses other than in an open roof construction of a vehicle. When a torsion spring 10 is used, said spring may also be positioned between inner tube 2 and winding tube 4. Moreover, it is conceivable in that case to use a solid inner tube 2. The principle of the invention can also be used with winding mechanism which do not comprise a torsion spring, but which comprise a driving motor or the like. Finally it is noted that inner tube 2 may also be fixed in frame 13 with its other end, in which case no stationary shaft 5 is provided and torsion spring 10 is fixed to the inner tube.

What is claimed is:

1. A winding mechanism for a sun screen, for example as intended for use in an open roof construction for a vehicle, comprising:

a stationary frame;

a flexible winding tube being rotatable about a central axis for winding and unwinding the sun screen wherein said central axis is curved;

a torsion spring engaging the winding tube for loading the winding tube to a wound position of the sun screen relative to the frame; and an inner tube that is fixed to the stationary frame of the winding mechanism with one end, at the location of a first end of the winding tube, while the other end of the inner tube terminates within the winding tube, wherein the winding tube is also mounted in bearings, at the other end thereof, on a stationary shaft which is fixed to the stationary frame, which stationary shaft is co-axial with said central axis.

2. The winding mechanism according to claim 1, wherein said central axis is defined by the inner tube, wherein the inner tube is stationary and curved, with the rotatable winding tube being mounted in bearings on said inner tube.

3. The winding mechanism according to claim 2, and further comprising a housing accommodating said winding tube, wherein said housing exhibits a curvature that corresponds to that of the central axis.

4. The winding mechanism according to claim 1, wherein said torsion spring is connected between said stationary shaft and said winding tube.

5. The winding mechanism according to claim 4, wherein said stationary shaft extends into the inner tube, and wherein said torsion spring is accommodated in the annular space that is formed between said stationary shaft and the inner tube.

6. The winding mechanism according to claim 1, wherein said stationary shaft extends into the inner tube, and wherein said torsion spring is accommodated in the annular space that is formed between said stationary shaft and the inner tube.

7. The winding mechanism according to claim 6, and further comprising a housing accommodating said winding tube, wherein said housing exhibits a curvature that corresponds to that of the central axis.

8. The winding mechanism according to claim 6 wherein an end of the torsion spring remote from the winding tube is connected to the stationary shaft.

9. The winding mechanism according to claim 1, and further comprising a housing accommodating said winding tube, wherein said housing exhibits a curvature that corresponds to that of the central axis.

* * * * *